Nov. 17, 1964   A. H. MOTTU ET AL   3,157,092
METHOD FOR THE AUTOMATIC CONTROL OF THE POSITIONING
OF A PLURALITY OF MOVABLE MEMBERS AND
APPARATUS TO CARRY OUT THE METHOD
Filed April 2, 1962                                     3 Sheets-Sheet 2

INVENTORS
ANDRE MOTTU
ROBERT VIRET
By Irwin S. Thompson
ATTY.

Fig. 3

INVENTORS
ANDRE MOTTU
ROBERT VIRET

United States Patent Office 3,157,092
Patented Nov. 17, 1964

3,157,092
METHOD FOR THE AUTOMATIC CONTROL OF THE POSITIONING OF A PLURALITY OF MOVABLE MEMBERS AND APPARATUS TO CARRY OUT THE METHOD
Andre H. Mottu and Robert Viret, Geneva, Switzerland, assignors to Societe Genevoise d'Instruments de Physique, Geneva, Switzerland, a corporation of Switzerland
Filed Apr. 2, 1962, Ser. No. 184,171
Claims priority, application Switzerland, Apr. 11, 1961, 4,259/61
17 Claims. (Cl. 90—13)

There are numerous automatic control devices available for the positioning of one or more movable members. The punched tape controls are among the most widely used. They comprise a tape, the perforations of which translate the orders to be given to the different movable members for position and in some cases for speed. The perforations indicate in particular the co-ordinates of the successive settings of the movable members. In the particular case where the punched tape controls are used for positioning the movable members of a machine-tool the punchings of the tape indicate the co-ordinates of the settings of the movable members of said machine-tool, for example the table (longitudinal co-ordinate), the mandrel carrying slide (transverse co-ordinate) and the tool carrying spindle (vertical co-ordinate) in the case of a boring milling machine.

Even if the known punched tape control devices used in connection with machine-tool are satisfactory for the positioning of the table and of the slide, they are not well suited for the positioning of the tool carrying spindle, which presents very special problems. The distance between the spindle and the cutting edge of the tool is not constant. It varies from one tool to the other and according to the wear of the tool. It varies also in an appreciable manner, relatively to the high precision of some machines, with the amount by which the male taper of the tool is driven into the inner taper of the spindle. The introduction of different corrections to account for these factors complicates the handling of the machine to such an extent that the advantages of an automatic control of the spindle are completely lost.

The present invention successfully overcomes all of these difficulties. It has for its object a method for the automatic control of the positioning of movable members comprising; stopping numerically at least one of said movable members in predetermined position; controlling numerically the speeds of the movements and the stopping in at least one rest position of another of said movable members; selecting numerically among others one group of analogue information and controlling the amplitudes and the positions of the strokes of said last mentioned movable member by means of said group of analogue information.

The present invention has also for its object an automatic control device for controlling the positioning of movable members to carry out the method comprising means for reading information from a movable introduction member having information therein, distributor means receiving said information, a plurality of movable members, a coarse and fine positioning device disposed between at least a first one of said movable members and said distributor means, said information from said distributor means controlling numerically said coarse and fine positioning device to move said first movable member to predetermined position, control means disposed between a second one of said movable members and said distributor means, said information from said distributor means preparing numerically said control means to move said second movable member to a predetermined position and means connected to said control means to operate analogically said control means for moving said second movable member to said predetermined position.

The attached drawing shows schematically and by way of example one embodiment of the control device according to the invention used for the control of the movable members of a machine-tool.

Figure 1:
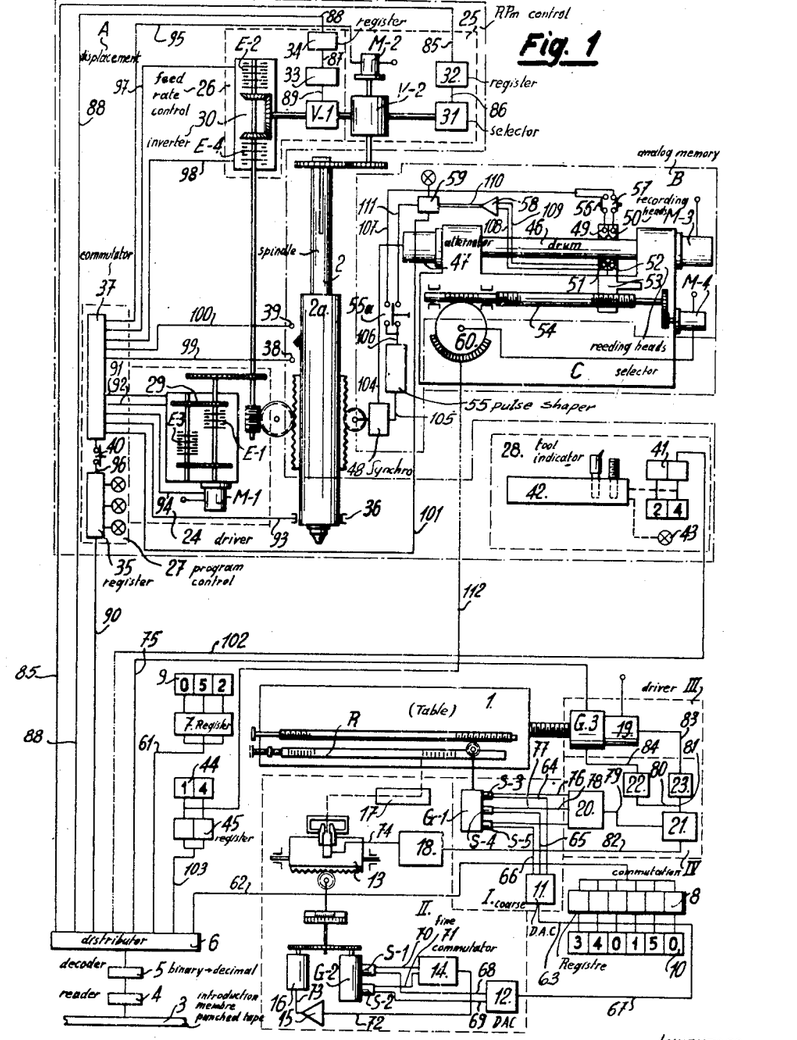
FIG. 1 is a diagram showing the electrical and mechanical apparatus for connecting the different members of the control devices which control the displacement of the table and the tool carrying spindle of the machine-tool.

The high precision machine-tool to be controlled by the novel control device according to the present invention is provided with a table 1, a slide (not shown) and a rotative tool carrying spindle 2, revolving in an axially displaceable spindle-sleeve 2a. The control device according to the invention comprises an introduction member 3 carrying the control information relative to said table, said slide and said spindle, means furnishing digital signals derived from the information carried by this introduction member, control devices for the table and the slide respectively, and a control device for the axially displaceable rotative spindle of the machine-tool.

In the example shown, the introduction member 3 carrying the control information is constituted by a punched tape having eight parallel recording tracks and complying with the E.I.A. standards (Electronic Industries Association).

This tape 3 is perforated according to an addressed binary code and comprises distinct blocks of information. Each block contains the necessary information to carry out one machining operation in accordance with the information recorded on the punched tape by the programming department.

The means furnishing the digital signals delivered from the information carried by the punched tape comprise a reader 4, commercially available on the U.S. market ("Friden" Commercial Controls Corp., Rochester, or "Creed" Creed & Co., Ltd., Croydon), a decoder 5, transforming the coded binary information into decimal information, which is constituted by a circuit of the type described in "Design of Switching Circuits," by W. Keisler, A. E. Ritchie, S. H. Washburn (Van Nostrand, Editor, sixth printing, chapter 12, Codes and Translating Circuits) and a distributor 6 of the information which is constituted either by a set of relays or by selectors of known type such as described in "Design of Switching Circuits" by W. Keisler, A. E. Ritchie, S. H. Washburn (Van Nostrand, Editor, sixth printing, pages 50 to 51, 4.8 Transfer tree circuits). This distributor 6 is controlled by the addresses of the information and directs this information to the different devices for which it is intended.

The automatic control device comprises further a register 7 which is constituted, like the other registers mentioned in this specification, by a group of selectors of the rotative or "cross bar" type available on the market or as described in "Design of Switching Circuits," by W. Keisler, A. E. Ritchie, S. H. Washburn (Van Nostrand, sixth printing, pages 194 to 199; 9.6 Switch restoring circuits) for example. The register 7 stores the signals which are delivered by the distributor 6 through electrical conductors 61 and controls the display of the number of the operation on a display 9. This display 9 as well as all the other displays of the control device are actually well-known and the described for example in "Numerical Readout," Instrument and Automation, June 1958, pp. 1032–1037.

The control devices for controlling the table and the slide are identical and only the one relative to the table will be described herebelow. This control device effects a point-to-point control, the principle and several forms of which are well known. This control device comprises a register 8 for storing the digital signals, received from the distributor 6 through electrical conductor 62, and relative to the stop position of the table 1. This register 8 controls: the display of the number corresponding to the desired setting figure of the table on a display 10: a coarse positioning device I and a fine positioning device II of the table 1. Each of said coarse and fine positioning devices furnishes an error signal controlling successively, by means of a commutation device IV, a driving device III actuating the table 1.

The coarse positioning device I comprises a digital to analogue converter 11 of the decade selector type (see "31 Numerically-Controlled Point-to-Point Positioning System," by J. D. Cooney and B. K. Ledgerwood, drawn from "Control Engineering," McGraw-Hill Publishing Co., Inc., January 1958, p. 28) which is connected through electrical conductors 63 to the register 8 and which transforms the digital signals, stored in the register 8 and corresponding to the first digits of the setting figure of the table 1, into analogue signals. Each of these analogue signals, corresponding to one decade of the setting figure, is transmitted by means of electrical conductors 64, 65, 66 to the stator windings of synchros S–3, S–4, S–5 respectively. The rotors of these synchros are mechanically connected by means of a reduction gear G–1 to the table 1. The reduction gear ratios of the mechanical connection of the rotor of each synchro S–3, S–4, S–5 is such as to obtain the same relative precision for each of the decades of the setting figure.

The fine positioning device II comprises a digital to analogue converter 12, of the same type as the converter 11 of the coarse positioning device I which is connected through electrical conductors 67 to the register 8 and which transforms the digital signals stored in the register 8 and corresponding to the last digits of the setting figure of the table 1, into analogue signals which feed, through electrical conductors 68, 69 the stator windings of two synchros S–1, S–2. The rotors of these synchros S–1, S–2 are mechanically connected to a micrometric carriage 13 by means of a reduction gear G–2, similar to the reduction gear G–1.

The signals furnished by the rotor windings of the synchros S–1, S–2 control, by means of an electronic commutator 14 connected to these rotor windings by electrical conductors 70, 71 and of an electronic amplifier 15 connected to the commutator 14 by electrical conductor 72, a motor 16 which is connected through electrical conductors 73 to the amplifier 15. This motor controls the displacement of the micrometric carriage 13, which is displaceable on an axis parallel to the displacement of the table 1. The electronic commutator 14, of the type described in U.S. Patent No. 2,848,670 (mixing circuit 22) switches the input of the electronic amplifier 15 from the synchro S–2 over to the synchro S–1 when the error signal furnished by the synchro S–2 falls below a preset level.

The micrometric carriage 13 carries a photo-electric microscope 17 scanning the image of a line of a precision scale R carried by the table 1. An electronic equipment 18, associated with the photo-electric microscope 17 and connected to it by electrical conductors 74, furnishes a second error signal which is a function of the distance situated between the axis of the photo-electric microscope and the reference line of the scale R. One suitable form of this photo-electric microscope and of its associated electronic equipment is described in detail in U.S. Patent No. 3,002,421 and in U.S. application Serial No. 191,857 filed on October 24, 1950, or in the corresponding U.K. Patent No. 686,274 respectively.

The driving device III of the table 1 comprises a motor 19 driving linearly the table 1 by means of a gear-box G–3 of the electromagnetic clutch type, such as described in U.S. Patent No. 2,812,671.

The ratios of the gear-box G–3 provide for the possible traverse speeds and for the successive slowing down speeds before the table reaches the desired stop position. The desired traverse speed is pre-selected directly by the digital signals delivered to said gear-box G–3 by the distributor 6 through electrical conductors 75, whereas the effective engagement of the gears for the pre-selected traverse speed and for the successive slowing down speeds is controlled by the commutation device IV.

The commutation device IV comprises a first change-over switch 20 connected to the rotor windings of the synchros S–3, S–4, S–5 by electrical conductors 76, 77, 78 respectively. This change-over switch 20 switches a second change-over switch 21 successively from the synchro (S–5, S–4) of the upper decade over to the synchro (S–4, S–3) of the immediately lower decade when the error signal furnished by the synchro of the upper decade falls under a preset level. This first change-over switch 20 is connected to said second change-over switch 21 by electrical conductors 79 and is similar to the electronic commutator 14 of the fine positioning device II.

Further, the second change-over switch 21 is connected to a commutator 22 and to a phase discriminator 23 by electrical conductors 80 and 81 respectively, as well as to the electronic equipment 18 of the photo-electric microscope 17 by electrical conductors 82. When the error signal of the synchro (S–3) of the last decade falls under a preset level the switch 21 switches the commutator 22 and the phase discriminator 23 from the switch 20 over to the electronic equipment 18 of the photo-electric microscope. The second change-over switch 21 is constituted by a "Schmitt Trigger" type circuit (Electrical Manufacturing, September 1959, p. 134).

The phase discriminator 23, of the type described in "Servomechanisms and Regulating System Design," by H. Chesnut and R. W. Mayer (John Wiley and Sons Inc., New York, p. 176, Figs. 5.8–1), is connected to the motor 19 by means of electrical conductors 83 and controls the direction of rotation of the motor 19 according to the phase of the signal which is delivered by the second change-over switch 21.

The commutator 22, which is constituted by a circuit of the "Schmitt Trigger" type controlling a set of relays, is connected to the gear-box G–3 by means of electrical conductors 84 and controls the engagement of the different ratios of this gear-box G–3.

This control device operates as follows:

The information carried by the punched tape 3 is transformed into digital signals by means of the reader 4 and the decoder 5 and is distributed to the register 8 and to the gear-box G–3 by the distributor 6.

The fine positioning device II sets the micrometric carriage 13 into a position corresponding to the fraction of millimeter (or inch) of the desired setting figure.

The coarse positioning device I furnishes an error signal which is proportional to the distance situated between the actual position of the table 1 and the desired setting position.

As the error signal supplied by the synchros S–5 and S–4 falls successively under the preset levels the change-over switch 20 disconnects the working synchro and switches over to the synchro of the lower decade.

When the error signal falls successively below the preset levels the commutator 22 engages successively the suitable transmission ratios of the gear-box G–3.

When the error signal delivered by the coarse positioning device I, that is to say by the change-over switch 20, reaches a preset level, the change-over switch 21 switches the driving device III over to the error signal furnished by the electronic equipment 18 of the photo-electric microscope 17, which controls the stopping of the table in its exact desired stop position.

The device for controlling the spindle 2 comprises on the one hand, means A numerically controlled by digital signals delivered by the distributor 6, which define the speeds of rotation and of axial displacement of the spindle as well as its rest and tool-changing positions, and on the other hand, a memory B of the type described in U.S. Patents No. 3,012,452 and No. 3,012,453. This memory B stores groups of analogue information, in the form of magnetic areas, which defines the amplitudes and positions of the working strokes of the spindle 2 for the various machining operations required. This spindle control device comprises further a selecting device C for choosing that particular group of analogue information contained in the memory B which corresponds to the desired machining operation.

The means A, numerically controlled by digital signals delivered by the distributor 6, comprise a driving device 24 which drives the spindle 2 in its axial displacements, a control device 25 which controls the speeds of rotation of the spindle, a control device 26 controlling the forward and return working speeds of the spindle, a control device 27 controlling the cycle of operations of the spindle and finally, in the embodiment shown, an identification device 28 for indicating the tool suitable for the desired operation.

The driving device 24 comprises a motor M-1 axially displacing the spindle-sleeve in one direction or the other by means of a mechanical linkage and of a reduction gear 29, either in a forward or return rapid movement when the two parts of a clutch E-1 are engaged, or in a final regulating movement when the two parts of a clutch E-3 are engaged.

The control device 25 for establishing the speeds of rotation of the spindle comprises a selector 31 connected by electrical conductors 86 to a register 32. The selector 31 is controlled by the digital signals stored in the register 32, to which these signals are delivered through electrical conductors 85 by the distributor 6, and selects the suitable gear ratio of a gear-box V-2 mechanically connecting a motor M-2 to the spindle 2.

The control device 26 for controlling the working speeds of the spindle comprises a selector 33 connected by electrical conductors 87 to a register 34. The selector 33 is controlled by the digital signals stored in the register 34, to which they are delivered through electrical conductors 88 by the distributor 6, and selects the desired gear ratio of a gear-box V-1. This gear-box V-1 is mechanically linked by its input shaft to the gear-box V-2 of the control device 25 and through its output shaft to an inverter device 30 comprising two clutches E-2, E-4 and an output shaft which is mechanically connected to the spindle-sleeve 2a.

These devices control the speeds of rotation and the working speeds of the spindle and are of the type described in U.S. Patent No. 2,545,008, while the gear-boxes V-1, V-2 with electromagnetic clutches are of the type described in U.S. Patent No. 2,812,671 (FIG. 6).

The device 27 which governs the cycle of operations includes a register 35 storing the digital signals delivered by the distributor 6 through electrical conductors 90.

A first group of the signals stored in the register 35 is used for the following purposes: (1) actuating the clutches E-1, E-2, E-3, E-4; (2) actuating a locking member 36 to lock the spindle-sleeve; and (3) stopping the motors M-1 or M-2 when the spindle 2 is in "surface" position (that is to say when the tool carried by said spindle is located about 2 millimeters above the workpiece to be machined). This first group of stored signals is transmitted to the corresponding members through an electronic commutator 37 upon order of the memory B as described hereinbelow.

This electronic commutator 37 is further electrically connected: to a register 35 by means of electrical conductors 96; to the clutches E-1, E-3, E-2, E-4 through electrical conductors 91, 92, 97, 98 respectively; to the locking member 36 through electrical conductors 93; to the motors M-1, M-2 by electrical conductors 94, 95 respectively and to a phase comparator 59 forming part of the memory B through electrical conductors 101.

On the contrary, a second group of the digital signals stored in the register 35, intended to stop the motors M-1 and M-2 when the spindle is either in high position or in tool-changing position, is transmitted to the corresponding members through the electronic commutator 37 when the spindle reaches these axial positions. The second group of signals actuates the contacts 38, 39 respectively which are connected to the commutator 37 through electrical conductors 99, 100 respectively.

A switch 40 serves to disconnect the electronic commutator 37 from the register 35.

The identification device 28 indicates the tool carried by the spindle and comprises a register 41 for storing the digital signals delivered through electrical conductors 102 by the distributor 6. These signals control a display of the suitable tool number. Further, a rack 42 receiving the tools lined up according to their identification number is inserted in series between the register 41 and a safety member 43 which draws the attention of the operator and locks the spindle 2 against axial displacement if the tool withdrawn from the rack is not suitable for the corresponding machining operation.

This spindle control device comprises further, in the example shown, a display 44 indicating the serial number of the operation to be performed. This display is controlled by a register 45 storing the digital signals delivered by the distributor 6 through electrical conductors 103.

The memory B comprises a rotative magnetic drum 46, the ends of which are mechanically connected to a motor M-3 and to an alternator 47, respectively. This alternator 47 is electrically connected by electrical conductors 104 to the stator windings of at least one synchro 48, the rotor of which is mechanically connected to the spindle 2. If several synchros were used, their rotors would be connected to the spindle through reduction gear of different ratios, similar to the reduction gear G-1, G-2, to increase the precision of the system.

This memory B further comprises magnetic recording heads 49, 50 and reading heads 51, 52 which are linearly displaceable along the drum 46. To this effect, these magnetic heads are, in the example shown, carried by a carriage 53 which is traversed by means of a screw 54 driven by a motor M-4.

The drum 46 comprises a series of circular tracks in front of which the magnetic heads can be placed in order to record or to read analogue signals on these tracks.

The rotor winding of the synchro 48 is electrically connected through electrical conductors 105 to a pulse shaper 55. This pulse shaper 55 is electrically connected through electrical conductors 106, a contactor 55a, electrical conductors 107 and interruptors 56, 57 respectively to the magnetic heads 49 and 50. This pulse shaper 55 transforms the signal induced in the rotor winding of the synchro, which is a function of the axial position of spindle 2, into pulses of very short duration, at the rate of one pulse per period. In the embodiment shown the phase of these pulses is a function of the axial position of the spindle. This pulse shaper 55 may comprise for example a symmetric amplifier, a saturable transformer, a limiter and an output amplifier. The elements of this pulse shaper 55 of known type are described in "Theory and Applications of Electron Tubes" by H. J. Reich (McGraw Hill Book Co., Inc. Editor, 1944, p. 133–135, FIG. 5.12, p. 515 and p. 516, FIG. 12.87d). The transformation to pulses of very short duration presents the advantage of a more precise determination of the phase than with sinusoidal signals.

Due to the rotative magnetic drum 46 being rigidly coupled with the alternator 47, the frequency of the signal furnished by the rotor winding of the synchro 48 is in synchronism with the series of pulses furnished by the pulse shaper 55 during the rotation of the drum 46.

The reading heads 51, 52 are electrically connected, through electrical conductors 108, 109 respectively, to a two channel amplifier 58 which is connected, through electrical conductors 110 to a phase comparator 59. The rotor winding of the synchro 48 is electrically connected by electrical conductors 105 to the aforementioned pulse shaper 55 which is itself connected by electrical conductors 106, contactor 55a and electrical conductors 111 to the phase comparator 59. The phase comparator 59 delivers error signals which are function of the phase differences between the analogue signals furnished, on the one hand, by the synchro 48 and the pulse shaper 55, and on the other hand, after amplification in the amplifier 58, by the reading heads 51 and 52 respectively. This phase comparator 59 is of the type comprising a "flip-flop" followed by a filter delivering the D.-C. component resulting from the rectangular signal furnished by said "flip-flop." If the D.-C. component requires amplification, it may be modulated by a "chopper" (see "Digital Method in Measurements and Control," by M. H. Notmann, "Electrical Manufacturing," September 1959, p. 131, FIG. 8b). These error signals furnished by the phase comparator 59 are then transmitted through electrical conductors 101 to the electronic commutator 37 of the program control device 27.

The magnetic heads 51 and 49 enable respectively the recording on the drum 46 and the reading out from said drum of analogue information, in the form of pulses of very short duration, relative to the "surface" position of the spindle 2.

The magnetic heads 50 and 52 enable respectively the recording on the drum 46 and the reading out from said drum of analogue information, in the form of pulses of very short duration, relative to the amplitude of the machining stroke which has to be effected.

This memory B serves to record groups of analogical information relative, in particular, to the amplitudes and positions of the axial working strokes of the spindle during the machining of a first piece and then to control, by means of these previously recorded groups of analogue information, the setting in operation of the control device 27 during the subsequent machining of identical pieces.

The number of groups of analogue information corresponding to the number of different machining operations which can be stored depends only on the number of circular tracks of the rotative magnetic drum 46. This number is at least fifty in the example shown.

The selecting device C comprises a rotative selector 60, driven in rotation by the screw 54 and electrically connected through electrical conductors 112 to the register 45 which stops the motor M–4 when the magnetic heads have reached the position corresponding to the digital signal stored in the register 45.

Figure 3:
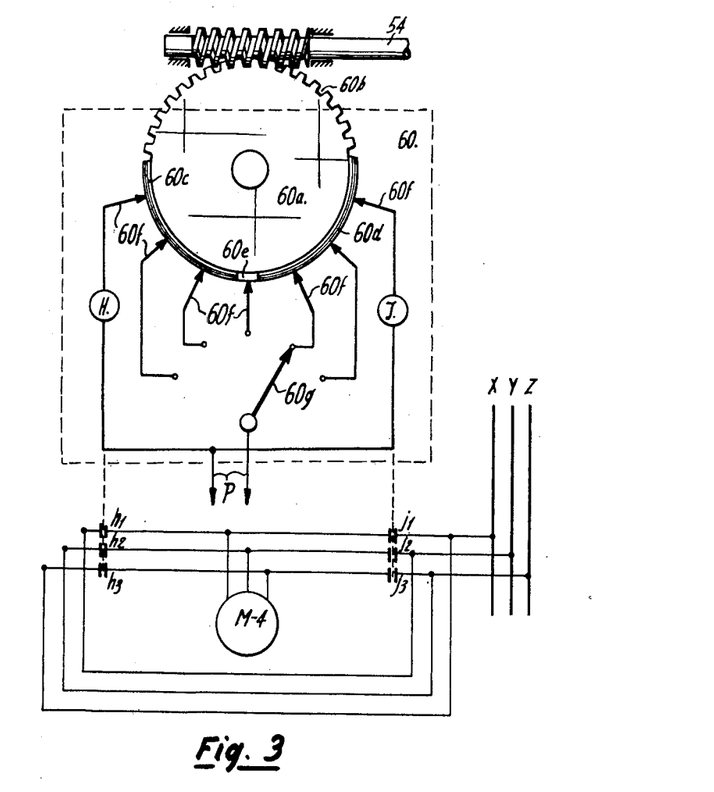
FIG. 3 is an electro-mechanical diagram of the selecting device C.

A particular form of the selecting device C is shown in FIG. 3. This illustrated selecting device comprises a disc 60a of insulating material provided on the upper half of its periphery with a toothed sector 60b in mesh with the screw 54 driven by the motor M–4.

On the lower half of its periphery, this insulating disc 60a carries two conducting strips 60c, 60d separated by an insulating plug 60e.

Conducting brushes 60f are uniformly distributed around the lower half of this disc. These brushes are in permanent contact with the conducting strips 60c, 60d, the outer ones being each permanently connected, through relays H and J, respectively, to one pole of an energizing supply P. All the other brushes are intended to be alternatively connected by a selector arm 60g to the other pole of the energizing supply P.

The position of this selector arm 60g is numerically controlled directly from the information carried by the punched tape in a well known manner.

Each of the relays H and J has three contacts $h_1$, $h_2$, $h_3$ and $j_1$, $j_2$, $j_3$ respectively. The contacts $h_1$, $h_2$, $h_3$ are inserted in the power supply circuit of the motor M–4 corresponding to one direction of rotation of this motor whereas the contacts $j_1$, $j_2$, $j_3$ are inserted in the power supply circuit of the motor M–4 corresponding to its other direction of rotation. In the example shown, the direction of rotation of the motor M–4 is reversed by the inversion of two phases of the power supply X, Y, Z.

Therefore the motor M–4 is energized from supply X, Y, Z and rotates in one direction or the other, depending upon which of the strips 60c, 60d is fed by the selector arm 60g and one of the brushes 60f. The motor M–4 drives the disc 60a through the screw 54, in a direction tending to bring the fed brush on the insulating plug 60e, thereby stopping the motor M–4.

The rotation of the screw 54 displaces the carriages 53 carrying the magnetic heads 49, 50, 51, 52 to place them into the position, in front of particular circular tracks of the drum 46, corresponding to the numerically selected brush 60f.

The operation of the spindle control device as described is as follows:

During the machining of the first piece of a series, the table and the slide are brought into their setting position either manually or by means of their respective automatic control devices. However, the automatic cycle control device 27 is disconnected and is thus inoperative, the operator having opened the interrupter switch 40. Then, the carriage 53 having been set in the position corresponding to the desired operation by means of the register 45 and the selecting device C, the operator connects the rotor winding of the synchro 48 to the pulse shaper 55 by means of the contactor 55a. The operator then moves the spindle forward manually until the extremity of the tool carried by said spindle is located in "surface" position, that is at two millimeters above the workpiece to be machined. The distance between the tool and the workpiece can be set by means of a gauge for example. The operator then actuates the switch 56, which causes the recording, on the chosen track of the drum 46, of the spindle "surface" position for a desired machining.

In another embodiment (not shown) the operator would move the spindle until the tool reaches the surface of the workpiece. In this case one introduces an electrical phase-shifting of the signal furnished by the pulse shaper 55 during the recording only, so that the recorded signal on the drum 46 corresponds in fact to the "surface" position of the spindle (extremity of the tool situated at two millimeters above the piece to be machined).

The operator again moves the spindle forward manually until its end machining position is reached; then, by actuating the switch 57, he registers this position in the memory B.

These operations are repeated for all the different machining operations to be performed by the tool carrying spindle.

From then on, it is possible to operate the machine-tool entirely automatically for the repetition of any one of the machining operations that were recorded in the memory B.

This previous recording being effected, the operator, in order to proceed to an entirely automatic machining operation, connects the rotor winding of the synchro 48 to the phase comparator 59 by means of the contactor 55a and sets the reader 4 in operation. This reader drives the tape 3 through a distance corresponding to one block of information which contains the necessary information for the control of one machining operation. This information is read out, decoded and distributed to the different registers 7, 8, 32, 34, 35, 41 and 45 by means of the reader 4, the decoder 5 and the distributor 6. This causes: the storage of the information relative to cycle of operations of the spindle in the register 35 of the control device 27; the displacement of the carriage 53 by the selecting device C until the magnetic heads carried by said carriage are situated in front of the desired tracks of the drum 46; the preselection of the speeds of rotation and of the working speeds of the spindle; the display of the number of operation and of the tool number as well as the identification of the tool. The information defining the direction of the axial displacement of the spindle, as well as the engagement of its forward or return speed or speeds, is however transmitted to the driving device 24 upon order given by the memory B by means of the electronic commutator 37.

In fact, this memory B, by means of the error signals delivered by the phase comparator 59 causes, in monitoring the electronic commutator 37, the following to occur:

(1) The passage from the rapid approach speed of the spindle to its chosen working speed when the tool carried by the spindle reaches a predetermined distance from the piece to be machined for example 2 millimeters (the position called the "surface" position).

(2) The passage from the chosen forward working speed of the spindle to its final regulating speed when the tool arrives at the proximity of the end of its working stroke. In certain cases, for example for through bores, the final regulating speed may be omitted.

(3) The reversal of the direction of the axial displacement and, in the case of a tapping operation, the reversal of the direction of rotation of the spindle when the end of the working stroke is reached.

(4) The passage from the final regulating speed to a return speed equal to the forward working speed then to a rapid return speed when the spindle is raised up to a determined position ("surface" position), or directly the passage from the final regulating speed to said rapid return speed, and eventually the stopping of the spindle in this "surface" position.

However, the stopping of the spindle in its high position or in its tool-changing position is caused, also by means of the electronic commutator 37, by the spindle itself upon actuation of the contacts 38, 39 respectively.

It is thus possible to obtain a great number of different cycles of operations of the spindle because the number of groups of analogue information recorded in the memory B may be very large, as much as fifty or more.

As appears clearly from the foregoing description, the amplitudes and the positions of the working strokes of the tool carried by the spindle 2 are not determined by the information carried by the tape 3 but are determined only by the memory B. Since it is very each to modify one group of analogue information stored in this memory, after the sharpening of a tool for example, the control device hereinabove described eliminates the drawbacks inherent to all the automatic control devices known at present.

Figure 2:
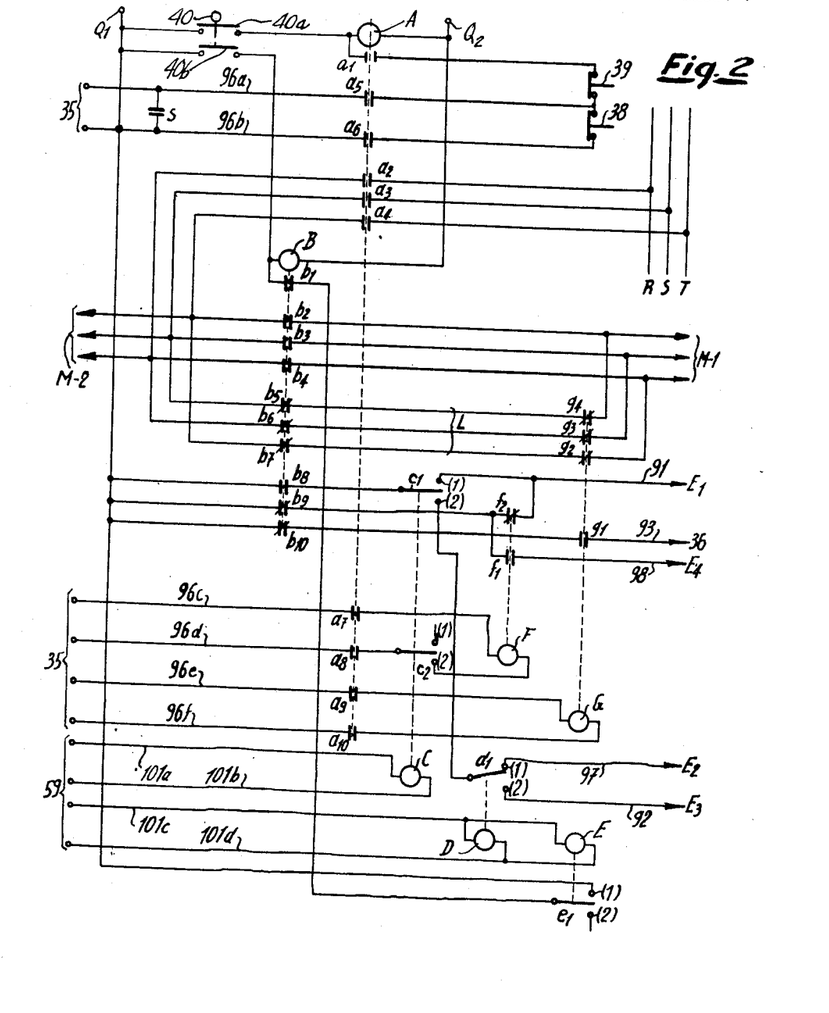
FIG. 2 is a wiring diagram of the electronic commutator 37.

The operation of the electronic commutator 37 is given herebelow for one of the several possible spindle cycles.

The spindle cycle taken as example comprises the following steps, the spindle being stopped at the beginning of the cycle in the tool-changing position:

(1) Starting the movement of the spindle at its rapid approach speed.

(2) Passage, when the spindle reaches the "surface" position, from the rapid approach speed to the chosen forward working speed of the spindle.

(3) Passage, when the spindle nears the end of the working stroke, from the forward working speed to the final regulating speed.

(4) Reversing the direction of the axial displacement of the spindle and passage from the final regulating speed to the working speed when the spindle reaches the end of its working stroke.

(5) Passage, when the spindle reaches again the "surface" position, from the return at the working speed to the rapid return speed.

(6) Stopping of the spindle in its tool-changing position.

This cycle corresponds to the machining of a dead hole for example.

It is assumed that the working speed has been chosen and numerically preselected in gear-box V–1 by the information contained in the punched tape. The group of analogue information of the memory B is also assumed to have been numerically preselected by the information contained in the punched tape through the selecting device C.

The orders have also been given to register 35 by the numerical information contained in the punched tape so as to stop the spindle in its tool-changing position at the end of its cycle (shunting contact $s$ (FIG. 2) between electrical conductors $96a$, $96b$ closed as well as for the return of the spindle from its end stroke position to the "surface" position at a speed equal to the working speed used for the machining.

Referring more particularly to FIG. 2, these orders, presented in the form of punched holes in the tape 3, appear in register 35 as energizing signals applied respectively between electrical conductors $96a$, $96b$ and $96c$, $96d$.

Further it is to be assumed that interruptor 40 serves to start the cycle. It is further assumed that the motors M–1, M–2 are stopped and that contacts 38, 39 are normally closed.

Since at the beginning of a cycle the spindle is not in "surface" position, (the spindle is now stopped in tool-changing position) the phase comparator 59 delivers a positive error signal to electrical conductors $101a$, $101b$ thus energizing the polarized relay C. Since the spindle is not in end stroke position, the phase comparator 59 delivers also a positive error signal to electrical conductors $101c$, $101d$ thus energizing the polarized relays D and E. The polarized relays C, D and E are in their normal rest position when no energizing current flows through them. They move in a first (1) state for a positive energizing current and in a second (2) state for a negative energizing current. It is also pointed out that the polarized relay D has a shifted zero position so that it already change-over for a positive value of the error signal applied to the electrical conductors $101c$, $101d$ which is still able to maintain relay E which change-over, as relay C, only when the corresponding error signal becomes negative.

At the beginning of this cycle the direction of the energizing current is such that the contacts $c_1$, $c_2$ of relay C; $d_1$ of relay D; and $e_1$ of relay E are in their first position indicated by (1) in the drawing (FIG. 2).

A D.C. supply circuit connected at points $Q_1$, $Q_2$ serves to energize the relays A and B, the clutches E–1, E–2, E–3, E–4 and the locking device 36. A power supply RST is provided for energizing the motors M–1, M–2.

From then on, the desired spindle cycle may be automatically performed as follows:

(1) The operator actuates the interruptor 40 to energize relays A and B through contacts $40a$, $40b$ respectively, thus connecting the electronic commutator 37 to the register 35 through electrical conductors $96a$, $96b$, $96c$, $96d$, $96e$, $96f$. The energizing of relay A causes the closing of all its contacts $a_1$ to $a_{10}$. The contact $a_1$ is a holding contact which is in series with the interruptors 38, 39 in an energizing circuit of relay A. The energizing of relay B causes the closing of the contacts $b_1$ to $b_4$ and $b_8$ and the opening of contacts $b_5$, $b_6$, $b_7$, $b_9$, $b_{10}$. The contact $_1$ is a holding contact which is in series with the now closed contact $e_1$ of relay E in an energizing circuit of the relay B.

This situation provides for:

(a) The feeding of the motor M-2 from the power supply RST through the contacts $a_2$, $a_3$, $a_4$.

(b) The feeding of the motor M-1 from the power supply RST through the contacts $a_2$, $a_3$, $a_4$ and $b_2$, $b_3$, $b_4$ so that the direction of rotation of the motor M-1 corresponds to the forward movement of the spindle.

(c) The energizing of clutch E-1 through electrical conductors 91 by means of contact $b_8$ and contact $c_1$, which is in its first position (1). This causes the spindle to be driven at its rapid approach speed.

As soon as the spindle has passed the tool-changing and the high positions, the interruptors 38, 39 remain closed until the end of the cycle. Thus the operator may release the interruptor 40 since the relay A remains energized through contacts $a_1$, 38 and 39, this release does therefore not modify the state of the electronic commutator 37. As the start of motor M-1 is very quick the operator may almost instantaneously release the interruptor 40.

(2) When the spindle reaches the "surface" position, the error signal delivered to electrical conductors 101a, 101b by the phase comparator 59 become negative thus the contacts $c_1$, $c_2$ of relay C move in their second position (2).

This causes the energizing, through electrical conductors 97, of clutch E-2 (contact $d_1$ is in its first (1) position) and the release of clutch E-1 to change over from the rapid approach speed to the forward working speed of the spindle.

This causes further, depending on the state of the register 35, the energizing of relay F through electrical conductors 96c, 96d.

(3) When the spindle arrives in the vicinity of the end of its stroke, in fact at a distance from the end of its stroke determined by the amount of which the zero of the relay D is shifted, the error signal delivered by the phase comparator 59 to electrical conductors 101c, 101d reaches a value for which the relay D is switched over. The contact $d_1$ moves thus in its second position (2) which causes the release of clutch E-2 and the energizing, through electrical conductors 92 of clutch E-3, and thus the passage from the forward working speed to the final regulating speed of the spindle.

(4) When the spindle reaches the end of its working stroke, the error signal delivered by the phase comparator 59 to electrical conductors 101c, 101d falls to zero and the relay E is deenergized. The contact $e_1$ moves in its rest, intermediate position which interrupts the energizing circuit of the relay B, thus deenergizing relay B so causes that:

(a) The motor M-1 is no longer fed through the contacts $b_2$, $b_3$, $b_4$ which are now open but through the contacts $b_5$, $b_6$, $b_7$ inserted in a loop L introducing the inversion of two phases in the feeding of the motor M-1. The direction of rotation of this motor M-1 is thus reversed. The motor M-1 revolves now in the direction corresponding to the return displacement of the spindle.

(b) The clutch E-3 is released and the clutch E-4 is energized through the contacts $b_9$ and $f_1$ and electrical conductors 98 so that the spindle returns at its working speed, thanks to the inverter device 30.

(5) Before the spindle reaches again the "surface" position, the phase comparator 59 delivers a positive error signal to electrical conductors 101c, 101d causing the energizing of the relay E and then, when the error signal is higher than the value to which the zero position of the relay D is shifted, the switching over of said latter relay. Thus the contacts $e_1$ and $d_1$ come back in their first (1) position. This has, of course, no effect at all since contacts $b_1$ and $b_8$ which are respectively in series with said contacts $e_1$ and $d_1$ are open.

When the spindle reaches the "surface" position, the phase comparator delivers a positive error signal to electrical conductors 101a, 101b causing the switching over of the relay C, the contacts $c_1$, $c_2$ of which are thrown over to their first (1) position.

This causes the deenergizing of relay F and thus the opening of its contact $f_1$ and the closing of its contact $f_2$. Thus, the clutch E-4 is deenergized and the clutch E-1 is energized through contacts $b_9$, $f_2$ and electrical conductors 91. The spindle is thus moved at the rapid return speed.

(6) When the spindle reaches the tool-changing position, it actuates the interruptor 39 and breaks the energizing circuit of the relay A. This interrupts the feeding of the motors M-1, M-2 stopping them, and disconnects the electronic commutator 37 from the register 35.

The spindle cycle is terminated and an identical cycle may start. If one desires to change the spindle cycle, new digital information must be sent to the register 35, the gear-box V-1 and the selecting device C.

The following table gives for each step of the above described spindle cycle the state of the different relays and elements of the electronic commutator 37. In that table a cross indicates for the relays A, B, F and G and for the clutches E-1, E-2, E-3, E-4 that the corresponding element is energized. For the polarized relays C, D and E a + indicates that the corresponding relay is in its first (1) state whereas a − indicates that the corresponding relay is in its second (2) state. A cross for the interruptors 38, 39, 40 indicates that the corresponding element is closed. A cross for the motor M-2 indicates that it is running. A + indicates that the motor M-1 is running in the direction corresponding to the forwarding of the spindle whereas a − indicates that this motor revolves in the reverse direction corresponding to the return of the spindle.

| Operation | A | B | C | D | E | F | G | 38 | 39 | 40 | M-1 | M-2 | E-1 | E-2 | E-3 | E-4 |
|---|---|---|---|---|---|---|---|---|---|---|---|---|---|---|---|---|
| 1 | X | X | + | + | + |   |   | X | X | X | + | X | X |   |   |   |
| 2 | X | X | − | + | + | X |   | X | X |   | + | X | X |   |   |   |
| 3 | X | X | − | − | + | X |   | X | X |   | + | X |   | X |   |   |
| 4 | X |   | − | − |   |   |   | X | X |   | − | X |   |   | X |   |
| 5 | X |   | + | + | + |   |   | X | X |   | − | X |   |   |   | X |
| 6 |   |   |   |   |   |   |   | X |   |   |   |   |   |   |   |   |

The electronic commutator 37 may comprise a further relay G intended to lock the spindle in its end stroke position if a milling operation has to be effected for example.

In the case where the locking of the spindle in its end stroke axial position is desired, a signal controlled by the punched tape 3 is applied to the electrical conductors 96e, 96f of the register 35 and energizes, during the spindle cycle, the relay G thus closing its contact $g_1$ and opening its contacts $g_2$, $g_3$, $g_4$. Thus when the spindle reaches its end stroke position and that the relay B is released in the aforesaid manner the following occurs:

(a) The interruption of the feeding circuit of the motor M-1 through contacts $g_2$, $g_3$, $g_4$ and thus the stopping of said motor.

(b) The energizing of the locking device 36 through contacts $b_{10}$ and $g_1$ and through electrical conductors 93.

The spindle is thus locked in its end stroke position and a milling operation may be carried out.

The relay G is deenergized when the milling operation is terminated and the spindle cycle continues with the above described operations 4, 5, 6.

One particular cycle of the spindle has been described in detail to show one mode of operation of the electronic commutator 37 but it goes without saying that numerous other cycles could be controlled with this electronic commutator 37.

We claim:

1. In a precision machine tool mechanism, a frame, a tool-carrying spindle movably mounted on said frame for axial and angular movements with respect thereto, power actuated means operatively connected to move said spindle in axial displacements, power actuated means operatively connected to rotate said spindle, a data carrying member having numeric control information recorded therein, reading means and distributor means receiving said numeric information from said reading means, a memory which stores groups of analogue information, selector means connected between said distributor means and said memory to numerically select one of said groups of analogue information stored therein, and control means electrically connected between said distributor means and both said power actuated means and also electrically connected to said memory, said control means controlling the axial and angular speeds of displacement of said spindle and defining the rest position of said spindle in accordance with said numeric control information, said control means additionally controlling the amplitude and positions of the working stroke of said spindle in accordance with the selected group of analogue information.

2. In precision positioning mechanism for controlling the axial and angular movements of an adjustable member of a machine tool; a rotative magnetic memory storing groups of analogue information, each of said groups comprising analogue information determining the amplitude and the positions of the working stroke of said adjustable member corresponding to a given machining operation; a numeric data carrying member and means for reading said data carrying member; distributor means receiving said numeric data from said reading means; program control means receiving said numeric data from said distributor means and said analogue information from said magnetic memory; power-actuated means operatively connected to move said adjustable member; said program control means controlling analogically said power-actuated means in response to said analogue information so as to determine the amplitudes and the positions of the working strokes of said adjustable member; selector means operatively connected to said magnetic memory; said distributor means controlling numerically said selector means in response to said numeric data, the latter means thereby selecting the group of analogue information stored in said magnetic memory corresponding to the desired machining operation.

3. A mechanism according to claim 2, wherein said magnetic memory comprises a magnetic drum driven in rotation; means generating a signal synchronized with said drum; recording heads and reading heads cooperating with said magnetic drum; means controlled by said selector means for displacing said heads along said drum; synchro means, coupled to said adjustable member and electrically connected to said signal generating means, for producing analogue signals proportional to the axial postions of said adjustable member; phase comparing means having its output connected to said program control means; means for connecting said reading heads to said phase comparing means; and means for alternatively connecting said synchro means to said recording heads and to said phase comparing means.

4. A mechanism according to claim 2, wherein said magnetic memory comprises a rotative magnetic drum; a motor driving said drum; an alternator driven in synchronism with said drum; recording heads and reading heads cooperating with said magnetic drum; carriage means supporting said heads for linear displacement along said drum; a screw traversing said carriage means; a motor controlled by said selector means and driving said screw; a phase comparator having an output connected to said program control means and three inputs; means for connecting said reading heads to two inputs of said phase comparator; synchro means electrically connected to said alternator and mechanically connected to said adjustable member for generating analogue signals proportional to the axial position of said adjustable member; and switching means for selectively applying the analogue signals generated by said synchro means to said recording heads for recording on said magnetic drum and to the remaining input of said phase comparator, thereby producing error signals at said phase comparator output indicating the difference between the desired positions and the actual positions of said adjustable member during its working stroke.

5. A mechanism according to claim 4, wherein said selector means comprises a register storing numeric data received from said distributor means; a disc driven in rotation by said screw; plural conducting strips carried by said disc and separated by an insulating plug; a plurality of brushes distributed around said disc to contact said strips; an energizing supply; a pair of relays each connected between one pole of said supply and two different brushes and having sets of contacts inserted in the supply circuit feeding the motor driving said screw; and selector switch means connecting the other pole of said supply to a third brush determined by the numeric data stored in said register, thereby actuating one of said relays and feeding the latter motor to drive said carriage means and said disc to predetermined postions in which said third brush engages said plug and said heads are aligned with the group of analogue information corresponding to the desired machining operation.

6. A mechanism according to claim 1, wherein said means to rotate said spindle comprises an electrical power supply, a driving motor selectively connected to said power supply by said control means, a register storing numeric control information received from said distributor means, means including a variable ratio gear box mechanically connecting said driving motor to said spindle, and gear selector means coupled between said register and said gear box to set the gear ratio of the latter in accordance with said numeric control information, thereby controlling the speed of rotation of said spindle.

7. A mechanism according to claim 1, wherein said means to move said spindle axially comprises an electrical power supply, a driving motor selectively connected to said power supply by said control means, a register storing numeric control information received from said distributor means, at least one variable ratio gear box, gear selector means coupled between said register and said gear box to set the gear ratio of the latter in accordance with said numeric control information, inverter means including first and second clutches alternately coupling the output shaft of said gear box to said spindle, and means included within said control means for selectively engaging and disengaging said clutches.

8. A mechanism according to claim 7, wherein said means to move said spindle axially further comprises an additional driving motor selectively connected to said power supply for rotation in either direction by said control means, mechanical means including third and fourth clutches alternately coupling said additional motor to said spindle, and means contained in said control means for selectively engaging and disengaging said third and said fourth clutches.

9. A mechanism according to claim 1, and further comprising a register storing numeric control information received from said distributor means and means connected to said register for indicating the tool carried by said spindle, the latter means including a tool rack and a security device controlled thereby, said security device immobilizing the spindle and warning the operator if the tool withdrawn from the rack is not the desired one.

10. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means for controlling the axially displaceable, rotative tool-carrying spindle which comprises means numerically controlled by signals delivered by the distributor means for defining the speed of rotation, the speeds of axial displacement, and the rest and tool-carrying positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, said table control means and said slide control means each further comprising a register for storing the corresponding numerical signals delivered by the distributor means, said coarse positioning means comprising a digital to analogue converter transforming the numerical signals, relative to the coarse positioning of the table and of the slide respectively, stored in said registers to analogue signals and means mechanically connected to the table or to the slide and electrically connected to the output of the digital to analogue converter, the latter means furnishing said first error signal.

11. A device as claimed in claim 10 in which said fine positioning means comprises a second digital to analogue converter transforming the numerical signals, relative to the fine positioning of the table and of the slide respectively, stored in said registers to analogue signals and means mechanically connected to a micrometric carriage, a photoelectric microscope carried by said micrometric carriage and electrically connected to the output of the second digital to analogue converter for the exact positioning of the micrometric carriage, said last-mentioned means furnishing said second error signal.

12. A device as claimed in claim 11 in which said table control means and said slide control means each comprises further an electronic commutator controlling a motor driving the table and the slide respectively, through a discriminator determining the direction of displacement, successively from the first error signal delivered by the coarse positioning means, then from the second error signal delivered by the photoelectric microscope carried by the micrometric carriage to stop the table and the slide in their predetermined positions.

13. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means for controlling the axially displaceable, rotative tool-carrying spindle which comprises means numerically controlled by signals delivered by the distributor means for defining the speed of rotation, the speeds of axial displacement, and the rest and tool-changing positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, said numerically controlled means further comprising means for identifying the tool being used, and said identifying means including a tool rack controlling a security device which is adapted to immobilize the spindle in its axial position and draw the attention of the operator if the tool withdrawn from the rack is not the desired one.

14. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means controlling the axially displaceable, rotative tool-carrying spindle which comprises means numerically controlled by signals delivered by the distributor means for defining the speed of rotation, the speeds of axial displacement, and the rest and tool-changing positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, each coarse positioning means comprising a digital to analogue converter transforming numerical signals from said distributor means into analogue signals which correspond to the desired positions of said table and said slide, respectively, and a plurality of synchros electrically connected to said converter and mechanically coupled to said table and said slide, respectively, each synchro producing an error signal.

15. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means for controlling the axially displaceable, rotative tool-carrying spindle which comprises means numerically controlled by signals delivered by the distributor means for defining the speed of rotation, the speeds of axial displacement, and the rest and tool-changing positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, said fine positioning means comprising a digital to analogue converter transforming numerical signals from said distributor means into analogue signals which correspond to the desired positions of said table and said slide, respectively, a micrometric carriage, a photoelectric microscope mounted on said carriage for reading the actual position of said table and said slide, respectively, plural synchros electrically connected to said converter and mechanically coupled to said micrometric carriage, each synchro producing an error signal, a servomotor driving said micrometric carriage, a commutator switch connecting said synchros in sequence to said servomotor and switching over from one synchro to the next when the synchro error signal falls below a preset level, and electronic circuit means for producing an output error signal indicating the reading taken by said microscope.

16. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means for controlling the axially displaceable, rotative tool-carrying spindle which comprises means numerically controlled by signals delivered by the distributor means for defining the speed of rotation, the speeds of axial displacement, and the rest and tool-changing positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, said means for driving the table and the slide, respectively, each comprising an electric motor and a gear box connecting said motor to the table and the slide, respectively, and conductor means connecting said gear box to said distributor means for control of the table and slide traverse speeds in accordance with the numeric control information received from said distributor means.

17. An automatic control device for controlling the positioning of movable members comprising an introduction member having control information stored therein, a reader, a decoder and distributor means for receiving the information contained in the introduction member, a plurality of movable members including a linearly displaceable table, a linearly displaceable slide, and an axially displaceable, rotative tool-carrying spindle, control means for positioning the table and control means for positioning the slide, each of said control means including a coarse positioning means which furnishes a first error signal and a fine positioning means which furnishes a second error signal, means for driving said table and said slide in response to said error signals, commutation means for successively applying said first and said second error signals to said driving means, and means for controlling the axially displaceable, rotative tool-carrying spindle which comprises means numerically controlled by signals delivered by the distributor means for defining the speed of rotation, the speeds of axial displacement, and the rest and tool-changing positions of said spindle, a memory which stores groups of analogically recorded information determining the amplitudes and the positions of the working strokes of the spindle for different machining operations, selecting means numerically controlled by signals delivered by the distributor means for selecting the group of analogue information corresponding to the desired machining operation, means analogically controlled by the selected group of analogue information for defining the amplitudes and the positions of the working strokes of the spindle, each coarse positioning means including a plurality of synchros mechanically coupled to said table and said slide, respectively, each synchro producing an error signal, said commutation means comprising first change-over switch means electrically connected to said synchros for switching in sequence from one synchro to the next when the active synchro error signal falls below a preset level, the output of said first change-over switch means effectively forming said first error signal, a commutator switch and a phase discriminator, second change-over switch means for applying said first error signal and then said second error signal from the fine positioning means in succession to said commutator switch and to said phase discriminator, and said means for driving the table and the slide, respectively, each comprising an electric motor connected to said phase discriminator which controls the direction of rotation of the motor and a variable ratio gear box including therein an electromagnetic clutch connecting the motor to the table and the slide, respectively, said gear box being electrically connected to said commutator switch which controls the operating gear ratios thereof and thus the linear displacement of said table and of said slide, respectively.

References Cited in the file of this patent

UNITED STATES PATENTS

| | | |
|---|---|---|
| 2,710,934 | Senn | June 14, 1955 |
| 2,748,665 | Senn | June 5, 1956 |
| 2,785,353 | Fenemore | Mar. 12, 1957 |
| 2,901,927 | Morgan | Sept. 1, 1959 |
| 2,998,560 | Mottu | Aug. 29, 1961 |